Nov. 13, 1956  E. R. BERLUTI  2,769,978
CLIP APPLYING DEVICES
Filed June 29, 1953  2 Sheets-Sheet 1
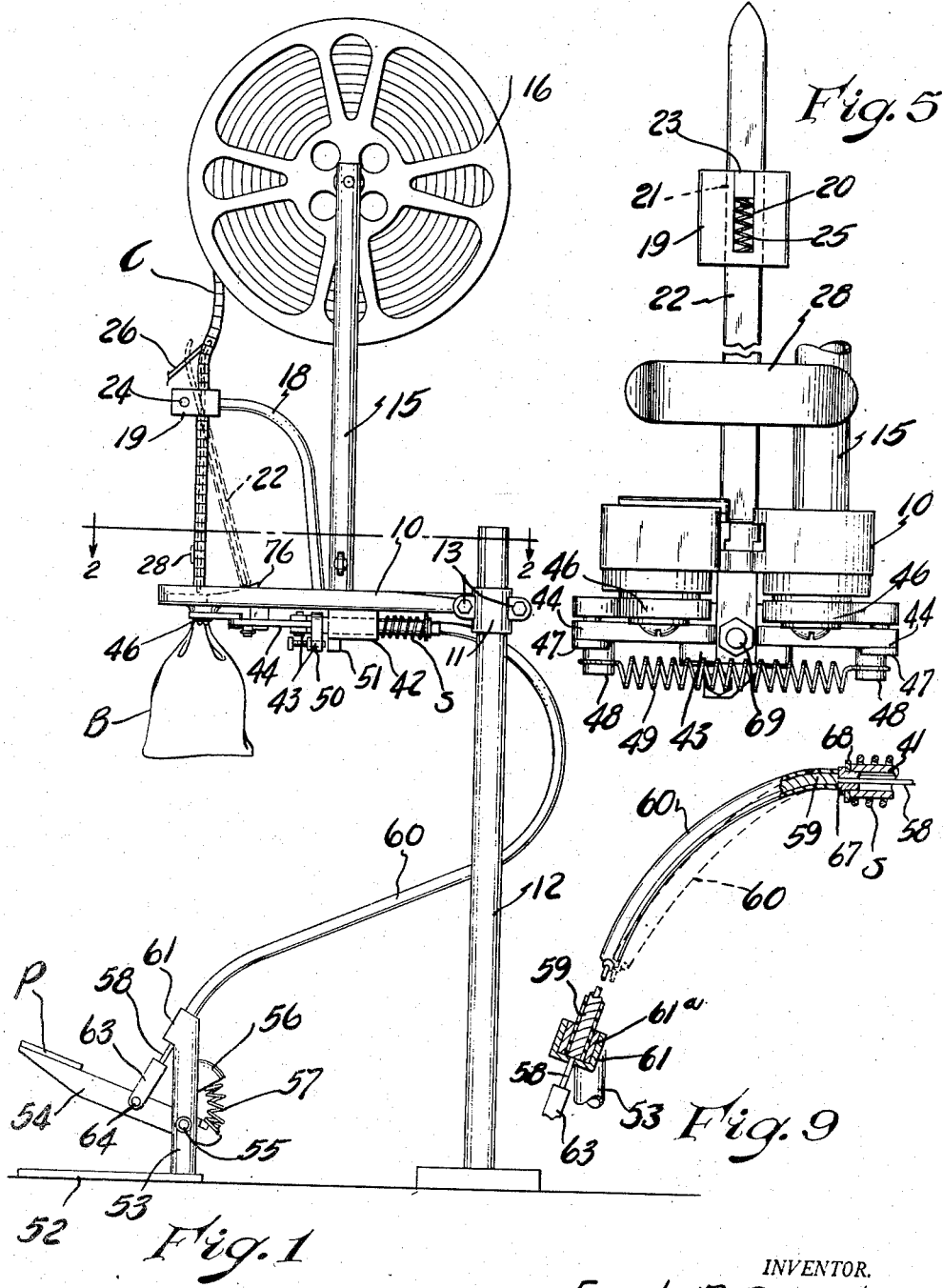
INVENTOR.
Ercole R. Berluti.
BY
Learmant Karman
ATTORNEYS

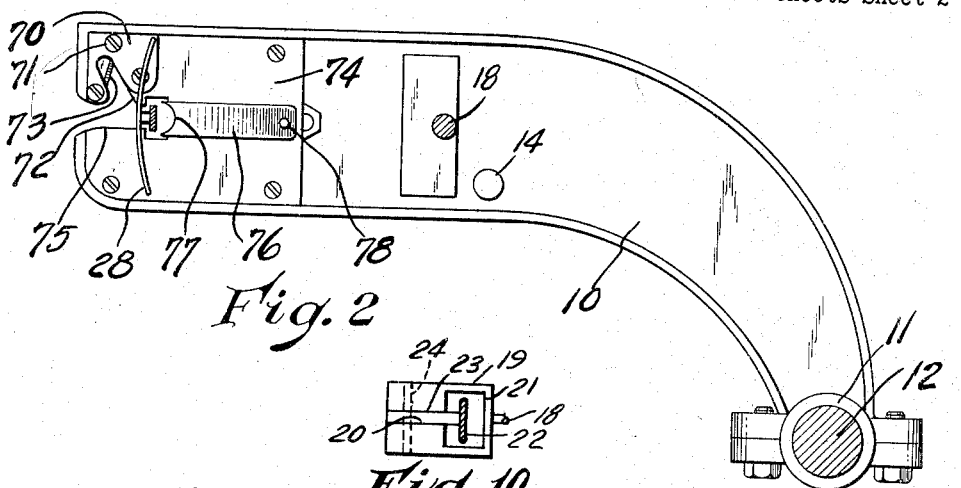

United States Patent Office 2,769,978
Patented Nov. 13, 1956

2,769,978
CLIP APPLYING DEVICES
Ercole R. Berluti, Saginaw, Mich.

Application June 29, 1953, Serial No. 364,601

10 Claims. (Cl. 1—187)

This invention relates to clip applying devices, and more particularly to a new and improved clip applying device for use in vacuum seal packaging refrigerated and frozen foods and other products.

Various mechanical devices have been employed to clinch standard U-shaped metal clips about the necks of conventional plastic, food-filled, air-evacuated bags or containers to preserve them in a vacuumized state. Heretofore, devices of this nature which were capable of effectively sealing air-evacuated packages have been of extremely complicated design. The various component operating parts of such devices had to be precision machined and assembled and consequently the machines were exceedingly expensive to manufacture and maintain.

One of the prime objects of my invention is to provide a clip applying machine of very simple, practical and economical design, composed of a minimum number of operating parts which need not be precision machined and assembled to the tolerances previously required.

A further object of the invention is to design a clip applying machine which is highly efficient in operation, and which makes a perfect clinch to effectively air-seal a bag each time the mechanism is actuated.

Another object of the invention is to design a compact machine of the type described which can be set up in any desired location, and which can be readily moved to other locations, if desired, thus permitting the establishment of extremely flexible production lines.

A further object of the invention is to design a clip applying machine which can be easily operated without undue physical or mental strain, thus reducing operator fatigue and permitting a given operator to perform his job more rapidly and increase his output.

A still further object of the invention is to provide a clip applying device of substantial and durable construction, composed of a minimum number of parts, all of which are easily removable for repair or adjustment when necessary after long and sustained use.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction, without departing from the spirit, or sacrificing any of the advantages of the invention.

In the drawings:

Fig. 1 is a side elevational view of my clip applying device, the broken lines indicating the rearward position of the clip track.

Fig. 2 is a sectional, plan view thereof taken on the line 2—2 of Fig. 1, the reel support pipe and foot pedal actuator being omitted and the clips also being omitted in the interests of clarity.

Fig. 3 is a fragmentary, plan view of the main support bracket or housing with the cover thereof removed.

Fig. 4 is an inverse plan view of the jaw housing showing the toggle linkage for operating the jaws, the broken lines indicating the clinching position thereof.

Fig. 5 is an enlarged, front elevational view of the clip feed track and jaw housing.

Fig. 6 is an enlarged view similar to Fig. 3, the broken lines illustrating the clinching position of the jaws.

Fig. 7 is a plan view showing a clip in the various stages of the clinching operation.

Fig. 8 is a fragmentary view of the upper portion of the clip track illustrating the manner in which the clips are fed to the track.

Fig. 9 is a sectional view of the cable assembly illustrating the manner in which it operates.

Fig. 10 is a sectional plan view taken on the line 10—10 of Fig. 8.

Referring now to the accompanying drawings in which I have shown the preferred embodiment of my invention, and more particularly to Fig. 1 thereof, my clip applying machine includes a channel-shaped main bracket or support 10 having a curved rear end portion provided with a socket 11 to accommodate a suitable support means such as the standard 12. Clearly, the bracket 10 is adjustable vertically on the standard 12 as desired, and can be clamped in adjusted position by tightening the bolts 13. The operator, of course, stands or sits facing the machine and continuously feeds the bags B to and removes them from the machine. A post 14 on the bracket 10 telescopically receives the tubular support 15 on which the clip carrying reel 16 is mounted, and a gooseneck or forwardly turned support post 18 is provided with a track bracket 19, which is slotted as at 20, and provided with a communicating track and clip accommodating vertical passage 21.

A clip feed track 22, having an integral, forwardly projecting counterweight lug 23 adapted to be accommodated in the slot 20 extends into said opening 21. The lug 23 is pivotally mounted offset from the track in the slot as at 24 and the track 22 is therefore swingable rearwardly as shown in broken lines in Fig. 1 of the drawings. The lower forward portion of the lug 23 is cut away, and a coil spring 25 is disposed between the bottom of the member 19 and the marginal wall of the cut-away portion of the lug so that the spring will be compressed when the bar 22 is swung rearwardly, and will thus aid in returning the track to forward position when permitted to do so.

The upper end of the track 22 is tapered and curved rearwardly so that the clips C readily slide thereon (see Fig. 1), these clips being mounted on a strip of paper 26 as shown in Fig. 8 and are fed from the reel to the upper end of the track 22. By reference to Fig. 7, it will be observed that portions of the ends of the clips C are pressed inwardly at 27 and the protrusions thus formed tend to retain the clips on the paper. The tapered end of the track 22 is inserted between the inner faces of the clips and the paper strip 26 to separate the clips therefrom, the clips sliding down the track, as shown, as the paper strip is pulled downwardly.

A push plate 28 is provided on the lower end of the track 22 which is disposed just above the bracket 10. The flanges of the channel-shaped support or bracket 10 are disposed upwardly, and it will be noted that the bottom of the forward end of the bracket is cut away or recessed as at 29, the innermost extremity of the recess being narrowed as at 30 centrally of the bracket 10 to form a guide slot into which the neck of a bag B can be placed.

Provided on the opposite sides of the slot 30 are relatively flat clinching jaws 31 which are provided with inwardly curved, finger-like heads 31a. The clip-engaging edges of the jaws are notched as at 32, and the extensions 33 formed thereby engage the depressed portions 27 of the clips when the jaws are swung laterally into clinching relation, all as indicated in broken lines in Fig. 6 of the drawings. Note that the shoulders thus formed on the jaws 31 are reduced in thickness as at 32a on opposite sides thereof to permit these portions of the jaws to overlap when the jaws are swung into clinching relation.

An anvil 34, having a semi-circular recessed end 35, is secured as at 36 rearwardly of the slot 30 and also serves to correctly position each clip C as it feeds off the lower end of the track 22.

The jaws 31 are mounted on pins 37, the rear ends of the jaws 31 being provided with slots 38 in which said pins are disposed. The jaws are thus swingable laterally and can thence be pulled rearwardly a distance controlled by the length of the slots 38. The jaws are moved through a defined path by cams 39, said cams being mounted on pins 40 which extend through the jaws 31 provided eccentrically thereon. The pins 40 extend through openings (not shown) provided in the bracket 10, and are actuated by a tubular plunger or slide rod 41 through suitable toggle linkage in a manner to be presently described.

The rod 41 is reciprocally supported by a bearing 42 provided rearwardly on the underside of the bracket 10, and is moved forwardly from a rearward position to operate the cams 39 and bring the jaws into clinching relation as illustrated by the broken lines in Fig. 4 of the drawings. Provided on the front end of the rod 41 is a connecting member 43 which is slotted to receive the rear ends of diverging toggle links 44, the rear ends of the links being pivotally connected to the member 43 by means of pins 45. Converging levers 46 which are rigidly fixed to the jaw actuating pins 40 are pivotally connected to the opposite ends of the links 46 by pins 47.

Provided adjacent the front ends of the links 44 are studs 48, and connected therebetween, to aid in returning the plunger 41 to rearward position, is a coil spring 49. A collar 50 on the plunger rod 41 engages the bearing 42 to limit rearward movement of the plunger, and a stop bracket 51, in the path of the member 43, controls the forward movement thereof. When the plunger rod 41 is actuated forwardly, the cams 39 are revolved to swing the jaws towards each other to close the ends of a clip C which has dropped from the track 22 into position in front of the anvil 34, this intermediate position being indicated in broken lines in Fig. 6 of the drawings, and further rotation of the cams 39, as the plunger completes its forward stroke, for the most part pulls the jaws rearwardly to press the ends of the clip C inwardly as indicated by the solid lines in Fig. 7, the extent of travel, of course, being controlled by the length of the slots 38.

While I have shown a very unique mechanism for actuating the plunger mechanically which is particularly well-suited for use with the instant clinching mechanism since its action is spring-cushioned, it will be obvious that the plunger could also be moved forwardly by suitable pneumatic or hydraulic means if desired, without departing from the spirit of the invention. The instant means is adapted to operate the plunger upon depression of a foot pedal P through a cable assembly, which is connected to the plunger in a novel manner to be presently described.

The foot pedal P comprises a base plate 52 which supports a standard 53, a pedal 54 being pivotally mounted on the standard as at 55. A socket 56 with a depending stud therein is provided on the standard 53, and a spring 57, connected between the stud and the end of the pedal 54, aids in returning the pedal to original position after a depression thereof. The pedal actuates a cable assembly which includes a cable 58 leading through a conventional wire sheath 59 having an outer covering 60 as usual. The cable assembly extends into a bushing 61a in a socket 61 provided on the upper end of the standard 53, the sheath 59 engaging the end wall of the socket 61, and the cable 58 extending entirely through the socket as shown. The end of the cable is connected to a clevis member 63 which is pivotally connected to the pedal 54 as at 64.

A bushing 67 is provided for the upper end of the cable assembly, and extends into the end of the tubular plunger 41, a spring S being mounted on the plunger between the bearing 42 and a washer 68 interposed between the end of the plunger and the head of the bushing. It is to be observed that the cable 58 extends through the bushing and plunger, while the end of the sheath 59 engages the head of the bushing 58. The cable 58 further extends through the member 43 and is connected to the stop bracket 51.

When the foot pedal P is depressed, the cable 58 which is rigidly fixed to the bracket 51 on the support 10, must be pulled downwardly, and this action can take place only by decreasing the radial position of the cable assembly and drawing it inwardly as shown in broken lines in Fig. 9. The longitudinally incompressible sheath 59 is prevented from moving downwardly with the cable 58 by the shoulder 62 in the socket 61, and consequently, when the entire cable assembly is pulled inwardly, the sheath acts on the bushing to force the plunger 41 inwardly. When the pressure on the pedal is released, the springs 49, S and 57, of course, return the plunger to rearward position, and the pedal to raised position.

After the neck of the bag B has been closed by a clip, it is desirable to cut off the loose upper end thereof, and I therefore provide a knife holder 70 secured to the housing 10 as at 71, (see Fig. 2), the holder 70 being slotted as at 72, and a knife 73 with a beveled cutting edge being mounted therein. Instead of directly withdrawing the bag B, the operator draws it into the slot 72 without interrupting his withdrawal motion and shears off the top of the bag.

A cover 74 is provided for the front end of the support bracket 10, this cover being recessed as at 75 and having an upwardly curved block 76 mounted thereon. The front end of the block 76 is similarly recessed as at 77, and it will be observed that a pin 78 is provided on the upper face thereof. The track 22 can feed but one clip at a time, since the distance from the lower end of the track to the bottom of the housing is only approximately equal to the width of the clip, and the block 76 prevents further clips from feeding (by gravity) off the track when the track is pushed rearwardly by the operator to move it out of the way. It will be observed that the pin 78 is provided adjacent the end of the block 76 so that the track is prevented from swinging past the rear edge of the block.

When the supply of clips on the track 22 has been exhausted, the operator merely pulls the strip 26 outwardly (see Fig. 8), and disengages more clips in the manner described which slide down the track. As shown in Fig. 1, the bottom clip on the track is discharged by gravity to the support bracket 10 and is guided to position partly by the surfaces 75 and 77. In deposited position, the legs of the clip will straddle the neck of the bag B and will accordingly be spaced slightly forwardly of the anvil 35 between the jaws 31. When the pedal 54 is depressed and the cable 59 moves the plunger forwardly in the manner previously described to revolve the cams or shafts 39 through the toggle linkage as previously described, the jaws 31 are swung inwardly, the legs or extension portions 33 engaging in the depressions 27 in the legs of the clip and closing the latter around the neck of the bag B. When the jaws thence are moved by the cams 39 primarily in a rearward direction, the shoulders 32 engaging the closed ends of the clip and, with the legs 33, moving the clip to the anvil 35, the legs of the clip are folded inwardly by further rearward movement of the jaws (as in Fig. 7). Once the clinched bag B has been withdrawn and the top sheared off, the track 22 returns forwardly and another clip drops into place. The track 22 is then, of course, pushed rearwardly as another bag is inserted. The anvil 35 is not spaced sufficiently rearward of the bag slot so that the flexible bag cannot travel the very slight distance with the clip required for the latter to bear on the anvil.

The operator can insert the bag with one hand, the other hand operating a suction mechanism (not shown) which extends into and draws the air out of the top of the bag. The pedal is, of course, depressed by the operator almost simultaneously to clinch a clip around the neck of the bag which is thus vacuum sealed. Two hands, one holding the top and the other the bottom, are then used to withdraw the bag through the knife to shear off its top.

It will thus be apparent that I have perfected a highly efficient clinching mechanism which is very easy to operate, and which can be economically manufactured and assembled.

What I claim is:

1. In a clip applying device, support means shaped to provide a recess into which the neck of a bag can be inserted, an anvil mounted on said support rearwardly of said recess, means for feeding a U-shaped clip including legs with depressions therein into position to be clinched, with the body portion thereof disposed forwardly of said anvil and the legs thereof extending forwardly to straddle the neck of said bag, oppositely disposed, substantially hook-shaped jaws having reversely curved adjacent ends pivotally mounted interjacent their ends on both sides of said recess, the inner walls of the hooked ends of said jaws being recessed to provide reduced leg portions engageable in the depressions in said legs of the clip when the jaws are swung laterally to close the legs of a clip about the neck of the bag, and means for swinging said jaws laterally and thence moving the jaws rearwardly toward said anvil to fold the ends of the clip inwardly, the recess of said jaws forming also substantially lateral shoulders engaging the legs and aiding in folding them inwardly when the jaws are moved rearwardly.

2. The combination defined in claim 1 in which the jaws are mounted in substantially co-planar relation and the shoulders formed by recessing the edges thereof are reduced on opposite faces thereof so as to overlap to predetermined degree when the jaws are swung into clinching relation, the reduced portions being limited as to width to stop the inward travel of the jaws at a predetermined point.

3. In a clip applying device, a support frame having a recess into which the twisted neck of a bag can be inserted, an anvil disposed rearwardly of said recess, means for feeding a U-shaped clip into position to be clinched, with the body thereof disposed adjacent said anvil and the legs thereof straddling the neck of said bag, jaws pivotally mounted interjacent their ends on both sides of said recess with the heads thereof disposed adjacent the free ends of the clip, and eccentric means pivotally mounted on said support frame and connected to said jaws for swinging said jaws laterally to bend the ends of said clip around the neck of said bag and thence moving said jaws rearwardly to fold the ends of said clip inwardly.

4. In a clip applying device for clinching a substantially U-shaped clip about the twisted neck of a bag, support means shaped to provide a recess into which the neck of the bag can be inserted, an anvil rearwardly thereof, shafts rotatably mounted on both sides of said recess, jaws pivotally mounted interjacent their ends on said shafts with the heads thereof disposed adjacent the free ends of a clip straddling the neck of said bag, guide pins provided on said support means, guide slots in the rear ends of said jaws accommodating said pins, said slots being of greater length than the diameter of the pins to permit a limited rearward movement of said jaws, and means for operating said shafts, said jaws being mounted eccentrically on said shafts so as to be swung laterally and thence moved rearwardly on actuation of said shafts.

5. The combination defined in claim 4 in which toggle linkage is connected to said shafts and reciprocable means actuates said toggle linkage to operate said shafts.

6. The combination defined in claim 5 in which said toggle linkage comprises converging levers rigidly connected to said shafts, and diverging links pivotally connected between said links and plunger.

7. In a clip applying device, a support frame having a recess into which the twisted neck of a bag can be inserted, an anvil disposed rearwardly of said recess, means for feeding a U-shaped clip into position to be clinched, with the body thereof disposed adjacent said anvil and the legs thereof straddling the neck of said bag, jaws pivotally mounted interjacent their ends on both sides of said recess with the heads thereof disposed adjacent the free ends of the clip, and cam means for swinging said jaws laterally to bend the ends of said clip around the neck of said bag and thence moving said jaws rearwardly to fold the ends of said clip inwardly, said cam means comprising shafts having eccentrically disposed pins projecting therefrom on which said jaws are pivotally mounted, and means for rotating said shafts.

8. In a clip applying device, a support frame having a recess into which the twisted neck of a bag can be inserted, an anvil disposed rearwardly of said recess, means for feeding a U-shaped clip into position to be clinched with the body thereof adjacent said anvil and the legs thereof straddling the neck of said bag, jaws pivotally mounted interjacent their ends on both sides of said recess with the heads thereof disposed adjacent the free ends of the clip, and cam means mounted on said support frame and connected to said jaws for swinging said jaws laterally to bend the ends of said clip around the neck of said bag, and thence moving said jaws rearwardly to fold the ends of said clip inwardly, the rear ends of said jaws having guide means thereon associated with said support for limiting rearward movement of said jaws.

9. In a clip applying device, support means, an anvil thereon adjacent which the twisted neck of a bag may be placed, means outward of the anvil for feeding a U-shaped clip into position to be clinched, with the body of the clip disposed adjacent said anvil and the legs thereof projecting outwardly away from said anvil to straddle the neck of said bag, jaws pivotally mounted interjacent their ends on both sides of the anvil and projecting outwardly beyond said anvil so as also to be in straddling relation with the neck of said bag adjacent the free ends of the clip, and eccentric means pivotal on said support means and connected to said jaws for swinging said jaws laterally to bend the ends of said clip around the neck of the bag and thence moving said jaws rearwardly toward said anvil to fold the ends of said clip inwardly.

10. The combination defined in claim 9 in which spring element is biased when the reciprocable means are moved to actuate the jaws to return the reciprocable element to original position when the cables slack.

References Cited in the file of this patent

UNITED STATES PATENTS

| | | |
|---|---|---|
| 1,878,417 | Matveyeff | Sept. 20, 1932 |
| 2,229,484 | Workman | Jan. 21, 1941 |
| 2,265,277 | Gerke | Dec. 9, 1941 |
| 2,375,769 | Childress | May 15, 1945 |
| 2,396,562 | Forss | Mar. 12, 1946 |
| 2,453,872 | Stauffer | Nov. 16, 1948 |
| 2,455,557 | Burner | Dec. 7, 1948 |
| 2,602,179 | Biraben | July 8, 1952 |
| 2,640,986 | Blumensaadt | June 9, 1953 |
| 2,647,814 | Chilton | Aug. 4, 1953 |
| 2,656,539 | Chilton | Oct. 27, 1953 |